(12) United States Patent
Mate et al.

(10) Patent No.: US 9,930,253 B2
(45) Date of Patent: Mar. 27, 2018

(54) METHOD AND APPARATUS FOR EXTENDABLE FIELD OF VIEW RENDERING

(71) Applicant: Nokia Technologies Oy, Espoo (FI)

(72) Inventors: Sujeet Shyamsundar Mate, Tampere (FI); Igor Danilo Diego Curcio, Tampere (FI)

(73) Assignee: Nokia Technologies Oy, Espoo (FI)

( * ) Notice: Subject to any disclaimer, the term of this patent is extended or adjusted under 35 U.S.C. 154(b) by 23 days.

(21) Appl. No.: 14/264,596

(22) Filed: Apr. 29, 2014

(65) Prior Publication Data

US 2015/0312477 A1 Oct. 29, 2015

(51) Int. Cl.
*H04N 5/232* (2006.01)
*H04N 5/225* (2006.01)

(52) U.S. Cl.
CPC ....... *H04N 5/23238* (2013.01); *H04N 5/2259* (2013.01)

(58) Field of Classification Search
CPC .................... H04N 5/23238; H04N 5/2259
USPC ........................................................ 348/36
See application file for complete search history.

(56) References Cited

U.S. PATENT DOCUMENTS

| | | | | |
|---|---|---|---|---|
| 2004/0239810 A1* | 12/2004 | Takahashi | .......... | H04N 5/44508 348/565 |
| 2006/0061602 A1* | 3/2006 | Schmouker | .......... | G11B 27/105 345/660 |
| 2006/0072020 A1* | 4/2006 | McCutchen | .......... | G03B 17/02 348/218.1 |
| 2010/0265313 A1 | 10/2010 | Liu et al. | | |
| 2012/0050558 A1* | 3/2012 | Nishimura | .......... | G06F 1/1626 348/222.1 |
| 2012/0249550 A1* | 10/2012 | Akeley | .................. | H04N 5/232 345/419 |
| 2014/0245367 A1 | 8/2014 | Sasaki et al. | | |
| 2015/0130912 A1* | 5/2015 | Fisher | .................. | H04N 5/4403 348/54 |

FOREIGN PATENT DOCUMENTS

WO   WO 2014/024475 A1   2/2014

OTHER PUBLICATIONS

Extended European Search Report for corresponding European Application No. 15158753.2 dated Jun. 12, 2015, 6 pages.

* cited by examiner

*Primary Examiner* — Frederick Bailey
(74) *Attorney, Agent, or Firm* — Alston & Bird LLP

(57) ABSTRACT

A method, apparatus and computer program product are provided for extendable field of view rendering. A method is provided for receiving media data including a plurality of video frames. The method also includes determining, with a processor, video frames corresponding to camera motion and determining speed and duration of the camera motion. The method also includes determining at least one frame extension based on the video frames corresponding to camera motion, determining a frame extension offset based on the camera motion, and generating an extended field of view metadata based on the frame extensions and frame extension offsets.

16 Claims, 9 Drawing Sheets

Composite Extended Field of View rendering

Overview of field of view shift during camera motion

Figure 7A  Composite EFOV playback single device configuration

Figure 7B  Composite EFOV playback two device configuration

Figure 7C  Composite EFOV playback three device configuration

Figure 8

METHOD AND APPARATUS FOR EXTENDABLE FIELD OF VIEW RENDERING

TECHNOLOGICAL FIELD

An example embodiment of the present invention relates to media rendering and, more particularly, to extendable field of view rendering.

BACKGROUND

Video clip media files generally consist of video frames that have the same resolution and the conventional method of video rendering does not allow utilization of the camera motion while video recording. Consequently, in an instance in which there is pan or tilt during the recording of the video, the scene portion corresponding to a fixed video frame resolution is recorded for each camera position. Therefore during playback of the recorded video, the content that was skipped by the camera movement is no longer available for rendering.

One method of generating a panorama of videos includes stitching the videos to generate a larger resolution video. However this approach results in larger video frame resolution which may not be suitably efficient for transmission, sharing, streaming, or the like. In another method a panorama image is generated from the video clip when the camera is panning or tilting.

BRIEF SUMMARY

A method and apparatus are provided in accordance with an example embodiment in order to generate extendable field of view renderings. In an example embodiment, a method is provided that includes receiving media data including a plurality of video frames, determining, with a processor, video frames corresponding to camera motion, and determining speed and duration of the camera motion. The method also includes determining at least one frame extension based on the video frames corresponding to camera motion, determining a frame extension offset based on the camera motion, and generating an extended field of view metadata based on the frame extensions and frame extension offsets.

In an example embodiment the method also includes rendering an extended field of view composite based on the media data and the extended field of view metadata. In this embodiment of the method, the rendering of the extended field of view composite is performed by multiple media playback components. In an example embodiment, the method includes setting an object of interest boundary and the at least one frame extension is further based on the object of interest boundary.

In an example embodiment the method also includes receiving sensor data associated with the media data. In this embodiment of the method the determining frames corresponding to camera motion is at least in part based on the sensor data and the determining speed and duration of the camera motion is further based on the sensor data. In an example embodiment, the frame extension offset is a frame angle offset or a frame time offset. In an example embodiment of the method the extended field of view metadata comprises a time range, a left extension offset, a right extension offset, a top extension offset, a bottom extension offset, or an extension factor.

In another example embodiment an apparatus is provided including at least one processor and at least one memory including computer program code, the at least one memory and computer program code configured to, with the processor, cause the apparatus to at least receive media data comprising a plurality of video frames, determine video frames corresponding to camera motion, and determine speed and duration of the camera motion. The at least one memory and computer program code are also configured to, with the processor, cause the apparatus to determine at least one frame extension based on the video frames corresponding to camera motion, determine a frame extension offset based on the camera motion, and generate an extended field of view metadata based on the frame extensions and frame extension offsets.

The at least one memory and the computer program code of an example embodiment are further configured to render an extended field of view composite based on the media data and the extended field of view metadata. In this embodiment of the apparatus the rendering of the extended field of view composite is performed by multiple media playback components. The at least one memory and the computer program code are further configured to cause the apparatus of an example embodiment to set an object of interest boundary and the at least one frame extension is further based on the object of interest boundary.

In an example embodiment of the apparatus, the at least one memory and the computer program code are further configured to receive sensor data associated with the media data. In this embodiment of the apparatus the determining frames corresponding to camera motion is at least in part based on the sensor data and the determining speed and duration of the camera motion is further based on the sensor data. In an example embodiment of the apparatus, the frame extension offset is a frame angle offset or a frame time offset. In an example embodiment of the apparatus the extended field of view metadata comprises a time range, a left extension offset, a right extension offset, a top extension offset, a bottom extension offset, or an extension factor.

In still a further embodiment, a computer program product is provided including at least one non-transitory computer-readable storage medium having computer-executable program portions stored therein, the computer-executable program code portions comprising program instructions configured to receive media data comprising a plurality of video frames, determine video frames corresponding to camera motion, and determine speed and duration of the camera motion. The computer-executable program code portions also include program code instructions configured to determine at least one frame extension based on the video frames corresponding to camera motion, determine a frame extension offset based on the camera motion, and generate an extended field of view metadata based on the frame extensions and frame extension offsets.

In an example embodiment of the computer program product, the computer-executable program code portions also include program code instructions configured to render an extended field of view composite based on the media data and the extended field of view metadata. In this embodiment of the computer program product, the rendering of the extended field of view composite is performed by multiple media playback components. The computer-executable program code portions also include program code instructions configured in an example embodiment to set an object of interest boundary and the at least one frame extension is further based on the object of interest boundary.

The computer-executable program code portions, of an example embodiment, also include program code instructions configured to receive sensor data associated with the media data. In this embodiment of the computer program product, the determining frames corresponding to camera motion is at least in part based on the sensor data and the determining speed and duration of the camera motion is further based on the sensor data. In an example embodiment of the computer program product the frame extension offset is a frame angle offset or a frame time offset. In an example embodiment of the computer program product the extended field of view metadata comprises a time range, a left extension offset, a right extension offset, a top extension offset, a bottom extension offset, or an extension factor.

In yet another example embodiment, an apparatus is provided that includes means for receiving media data including a plurality of video frames, means for determining video frames corresponding to camera motion, and means for determining speed and duration of the camera motion. The apparatus also includes means for determining at least one frame extension based on the video frames corresponding to camera motion, means for determining a frame extension offset based on the camera motion, and means for generating an extended field of view metadata based on the frame extensions and frame extension offsets.

BRIEF DESCRIPTION OF THE DRAWINGS

Having thus described example embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

Figure 1:
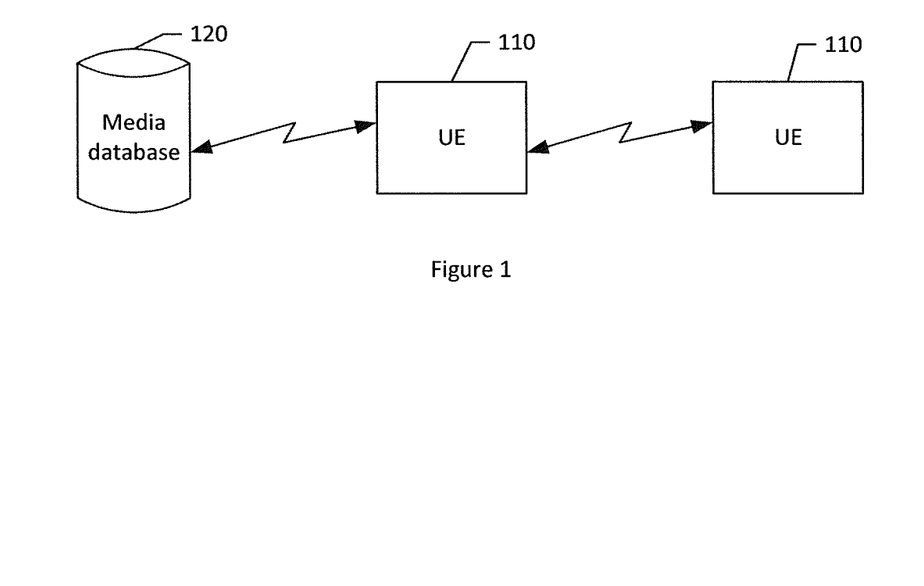
FIG. 1 illustrates a communications diagram in accordance with an example embodiment of the present invention.

A method, apparatus and computer program product are provided in accordance with an example embodiment for extendable field of view rendering. FIG. 1 illustrates a communication diagram including user equipment (UE) 110 and a media database 120. The UE 110 may be a mobile phone, tablet computer, laptop computer, personal data assistant (PDA), digital television, desktop computer, or the like. The media database 112 may be a memory associated with a server, a network, a removable storage, or any other media storage device.

The UE 110 may be in data communication with one or more other UEs and/or one or more media databases 120. The UE 110 may be associated with one or more cameras and/or microphones, which may be utilized to capture video and/or audio media data. The UE 110 may additionally be associated with sensors, such as a magnetic compass, an accelerometer, a gyroscope, or the like. The UE 110 may collect sensor data associated with motion of the camera.

The UE 110 may process the media data and/or sensor data to generate an extended field of view (EFOV) composite or may transmit the media and/or sensor data to the media database 120 or other UEs 110. The media database 120 may store the media and/or sensor data for later processing. A UE 110 may receive the media and/or sensor data from a media database 120 or another UE. The transmission and receipt of media data, sensor, data, and/or the EFOV metadata, discussed below, may be executed using a suitable communication protocol at any layer of the International Standard Organization's Open System Interconnect (ISO OSI).

The UE 110 may determine the frames of video which are associated with camera motion when the video was recorded. The UE 110 may determine the frames of video associated with camera motion based on the sensor data. For example, pan of the camera may be determined by magnetic compass, accelerometer, gyroscope, or like sensor data, and tilting may be determined by accelerometer, gyroscope, or like sensor data. The sensor data associated with a magnetic compass, accelerometer or gyroscope provide computationally efficient data for determining the camera motion time and duration. Additionally, the sensor data may be used to determine the speed of the camera motion. The UE may correlate time data associated with the media data and time data associated with the sensor data to determine the video frames associated with camera motion.

Additionally or alternatively, the UE 110 may determine camera motion duration and speed and associated video frames based on calculating a global camera pose estimate (global CPE). The global CPE is calculated by matching the content of the video data with street level images from a global database of a location based service provider. The calculated global CPE trace may provide an accurate description of the camera motion, e.g. duration, time, change of camera pose, or the like. Further, since the global CPE is based on the video data, itself, there is a reduction of error due to association of multiple data sources, e.g. media time and sensor data time.

In an example embodiment, the media data is available without associated sensor data. In an instance in which sensor data is not available for a media data, the UE 110 may generate EFOV metadata based on the media data only.

Figure 3:
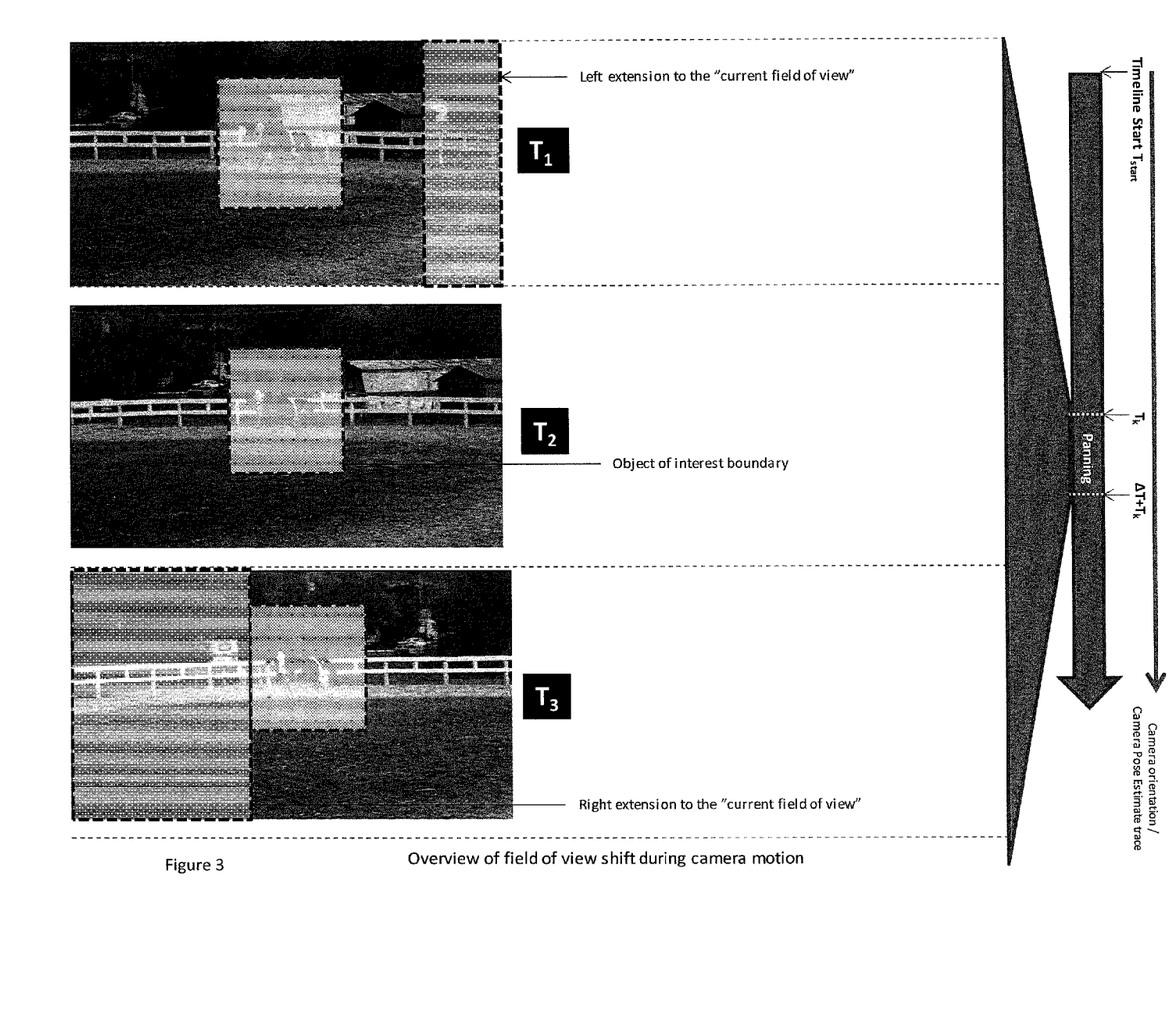
FIG. 3 illustrates an example overview of field of view shift during camera motion in accordance with an embodiment of the present invention.
Figure 4A:
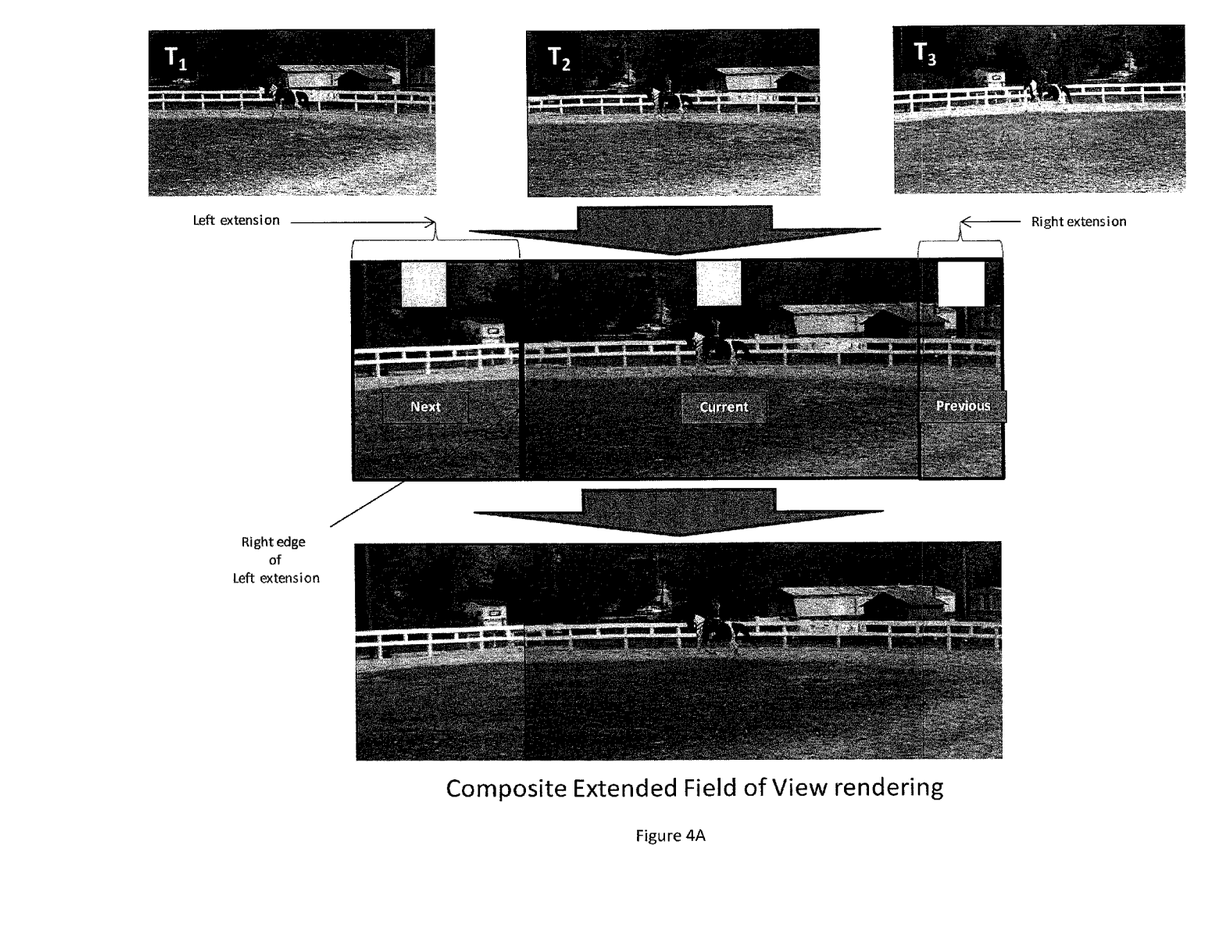
FIGS. 4A and 4B illustrate an example overview of field of view shift during camera motion and associated composite extended field of view rendering in accordance with an embodiment of the present invention.

The UE 110 may determine the frame extension field, e.g. upper/lower, left/right, or the like, by determining the portion of the previous and subsequent frames which are not a portion of the current frame, as depicted in FIGS. 3 and 4A. In the example depicted in FIGS. 3 and 4A the left frame extension is derived from a frame subsequent to the current frame and the right frame extension is derived from a frame previous to the current frame. The frame extension width may be the portion of the determined previous and subsequent frames which are not a portion of the current frame.

Frame extension width=width of (region covered at angular position $A_1$–region covered at angular position $A_2$)

The width of the frame extension may be the portion of the determined previous and subsequent frames which are not part of the current frame.

In some embodiments, the camera motion may be associated with tracking an object of interest (OOI). The camera may be configured to pan or tilt to maintain an OOI in the field of view of the camera. The UE 110 may set a boundary identifying the area in which the OOI is located in a frame to be extended, for example the rider and horse are within the boundary depicted in FIG. 3. In this embodiment, the UE 110 may exclude the OOI boundary area from the frame extension determination.

Figure 4B:
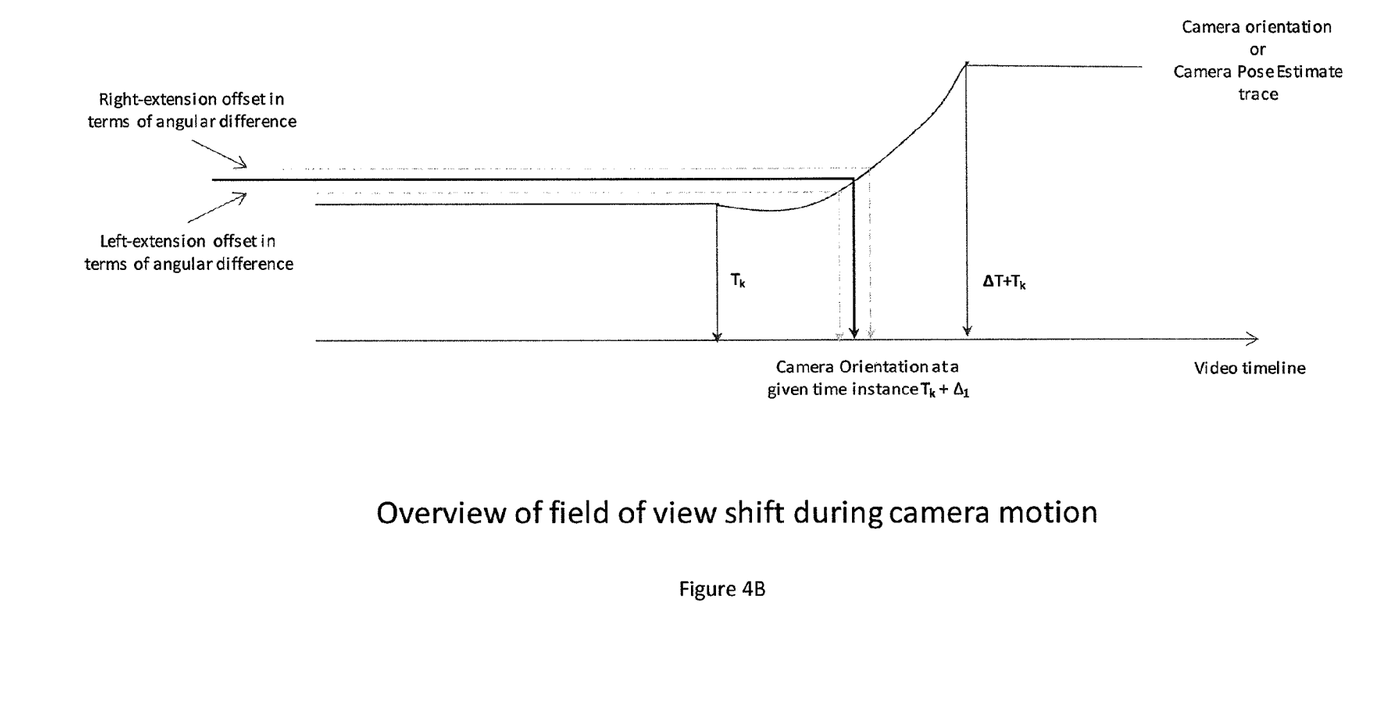

The UE 110 may determine the amount of frame extension to incorporate into a composite rendering based on the amount of field of view expansion required, e.g. extension ratio (ER) as set forth below. For example, the non-overlapping regions in the video frames during the camera motion may be used to generate a composite video rendering to fit the resolution of the display or user interface, as depicted in FIG. 4B.

$ER$=(Frame extension width)/(Full frame resolution)

The extension ratio may be the frame extension width divided by the full frame resolution of the user interface 28.

The UE 110 may determine an angle offset between the center region of the frame, which may contain the OOI, and the frame extensions. Frame extension angle offsets may be the difference in camera capture angle at the time of capture of the media. In an embodiment, the respective frame extension angle offsets may be determined by the angular difference of the camera pose and the respective frame extension based on camera orientation. For example the angular difference may be determined by using the instantaneous orientation with respect to a point, such as north, using sensor data, such as provided by a gyroscope, a compass, or the like.

Additionally, frame extension timing offsets may be calculated based on the respective frame extension and the speed of the camera motion. The UE 110 may determine the desired frame extension and use the speed, e.g. velocity of the camera motion ($CM_V$) and duration of the camera motion ($CM_D$) as derived from the sensor data or global CPE, to search for a frame which fulfills the following criteria; 1) left extension visually aligns with current frame, and 2) the width of the desired frame extension is satisfied. The frame extension timing offset is determined in number of frames (N). The UE 110 may advance N frames and derive a time frame extension offset based on frame rate. N1 may be the frame offset for the frame extension that is associated with a frame that is subsequent to the current frame and N2 may be the frame extension offset that is associated with a frame that precedes the current frame, as set forth below:

$N_1, N_2 = f1(ER, CMv, CMd), (N_1/\text{frame rate } (F_R)$ in frame per second (FPS),$N_2/$frame rate in FPS)< $CM_D$ The frame extension time offsets may be a function of the extension ratio, camera motion velocity, and/or camera motion duration.

The maximum duration of an EFOV composite rendering is approximately the camera motion duration, and the number of frames of EFOV composite rendering may be the duration of the camera motion multiplied by the frame rate as set forth below:

Number of frames for EFOV composite rendering=$CM_D * F_R$

In some embodiments, frame extensions, such as left and right frame extensions, may have different angle offsets. For example, as depicted in FIG. 4A, the OOI, e.g. the horse and rider is moving with the camera motion. The center portion of the composite rendering is the current frame and timeline base. The time left frame extension is taken at an instance T3 where T3>T2). The time right frame extension is taken at an instance T1 (where T1<T2), T3 has a larger offset than T1. The angle offset of T1 to T2 may be smaller than the angle offset of T2 to T3.

The UE 110 may generate extended field of view (EFOV) metadata based on the frame extensions and frame extension offsets. EFOV metadata may include time range, frame extension offsets, extension factors, or the like. A time range metadata may include or be associated with information determining the temporal period during which EFOV playback is to be performed. The respective frame offsets and extension factors may be determined for the given temporal period. Frame extension metadata may be the value of the time offset in terms of time or frame number with respect to the current temporal playback position and angle offsets of the center of the field of view (FOV) extension with respect to the center of the current playback, for appending to the respective portion of the current image, (e.g. left, right, top, bottom, or the like). The extension factor may indicate the amount of FOV extension that is desired. The extension factor may be a ratio of FOV extension section and current native playback resolution. The extension factor may be used to select the frame extension offsets required for a given extension factor requirement.

The UE 110 may transmit or receive the EFOV metadata with the media data as discussed. The UE 110 may render the FOV composite based on the media data and EFOV metadata as discussed below or store the EFOV metadata in a local or remote memory, such as the media database 120. The EFOV metadata may be stored in association with the media data or as a portion of the media data. In some example embodiments a media identifier is appended to the EFOV metadata to associate the EFOV metadata with the media data in an instance in which the media data is not necessarily stored as a part of or associated with the EFOV metadata.

In an example embodiment, the UE 110 may use multiple media playback components (MMPC) to render the field of view composite. MMPCs may simultaneously perform rendering from a single or multiple media sources, such as the UE 110 itself, other UEs, or media databases 120, for example multiple media clips. The utilization of MMPCs to render a composite FOV is discussed in FIG. 5.

Example Apparatus

Figure 2:
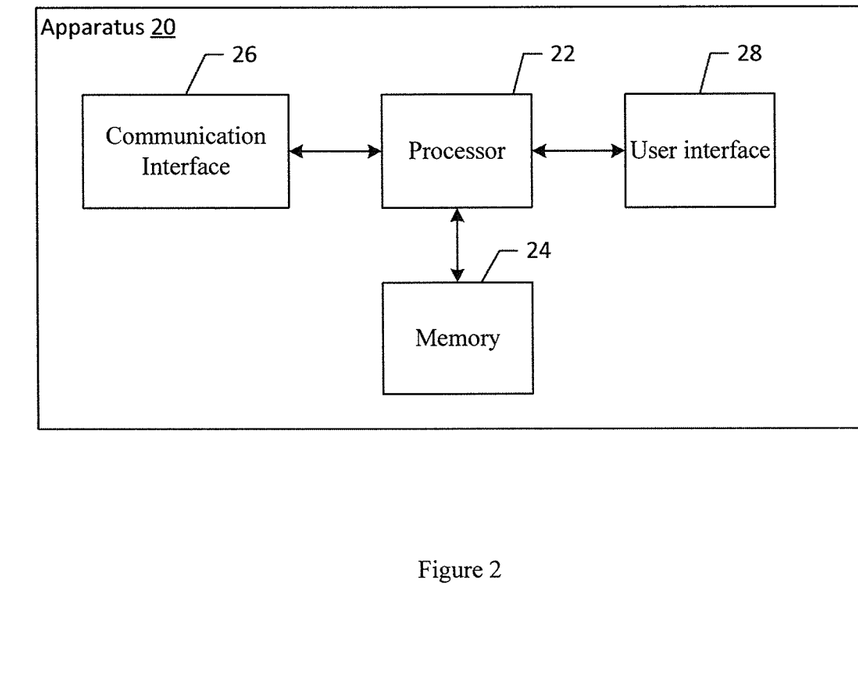
FIG. 2 is a block diagram of an apparatus that may be specifically configured for extendable field of view rendering in accordance with an example embodiment of the present invention.

A UE 110 may include or otherwise be associated with an apparatus 20 as shown in FIG. 2. The apparatus, such as that shown in FIG. 2, is specifically configured in accordance with an example embodiment of the present invention to provide for extendable field of view rendering. The apparatus may include or otherwise be in communication with a processor 22, a memory device 24, a communication interface 26, and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by UE 110. However, in some embodiments, the apparatus may be embodied as a chip or chip set. In other words, the apparatus may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include a communication interface 26 that may be any means such as a device or circuitry embodied in either hardware or a combination of hardware and software that is configured to receive and/or transmit data from/to a communications device in communication with the apparatus, such as to facilitate communications with one or more user equipment 110, utility device, or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 20 may also include a user interface 28 that may, in turn, be in communication with the processor 22 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 24, and/or the like).

Example Field of View Shift During Camera Motion

FIG. 3 illustrates an example of a field of view shift during camera motion. The time line starts at the top with time start and continues to the bottom as camera orientation and/or camera pose estimate trace changes. Tk indicates the start of the camera motion, e.g. panning, ending at $\Delta T+Tk$. The first image (T1) is the video frame at time Tk, the second image represents a current frame, and the final image (T3) is the video frame at time $\Delta T+Tk$.

Each video frame T1-3 includes an OOI, e.g. the rider and horse, and an OOI boundary depicted as the greyed area in the center of each image with dashed boundary box. The T1 video frame illustrates the left extension to the current field of view and T3 illustrates a right extension to the current field of view.

Example Composite Extended Field of View Rendering

FIG. 4A illustrates an example extended field of view composite rendering. The UE 110 may select the video frames T1-3 as depicted separately at the top of FIG. 4A. The UE 110 may then determine frame extensions and frame offsets associated with video frames T1-3 as described in FIG. 1. The resultant video frames T1-3 are depicted as connected units of an image. The left most portion of T3 is the left frame extension. The left frame extension right edge is visually aligned with the left edge of the current frame using the frame extension angle offset. Similarly, the right most portion of video frame T3 is the right frame extension. The left edge of the right extension is visually aligned with the left edge of the current frame using the frame extension angle offsets. The UE 110 may render the EFOV composite image of video frame T1-3 as depicted in the bottom image, in which the portions of T1-3 have been determined to be aligned and boundaries, e.g. edge lines, have been removed.

FIG. 4B illustrates the change in camera orientation over time graph for the field of view shift. The camera angle is constant until time Tk, and from time $\Delta T+Tk$ to the end of the graph, time elapsing from left to right. From time Tk, frame, e.g. T1 of FIG. 4A, to time $\Delta T+Tk$, e.g. frame T3 of FIG. 4A, the camera orientation angle changes in a positive direction, or up on the graph. A current frame, e.g. T2 of FIG. 4A, camera orientation is depicted with the solid arrow at time $Tk+\Delta 1$. The dotted lines on either side of the current frame arrow depict the time and camera angles associated with T1 and T3. The relative frame extension angle offsets are depicted as the difference of camera angle for the time associated with the extension frame and the current frame on the vertical axis. As depicted the upper line associated with the later time of $\Delta T+Tk$ is the right frame extension angle offset, and the lower line associated with earlier time Tk is the left frame angle offset extension offset. Similarly, the frame extension time offset for the right and left frame extension is depicted by the respective arrows intersection with the horizontal axis.

Example Composite Extended Field of View Rendering

Figure 5:
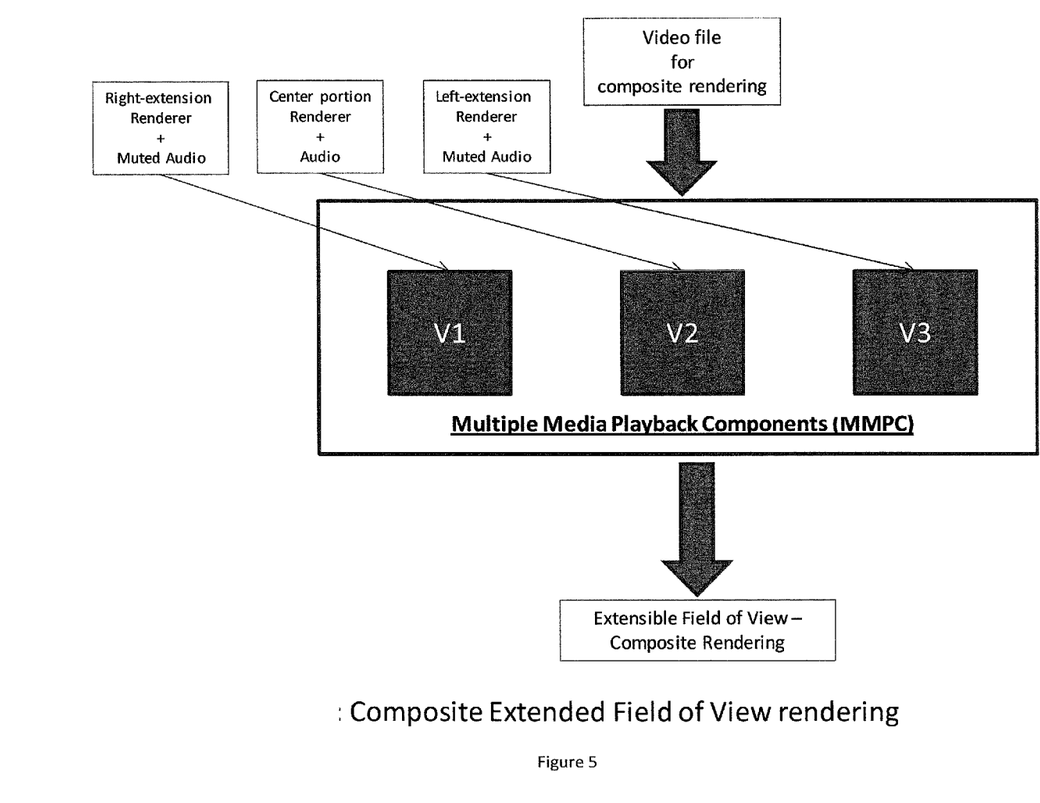
FIG. 5 illustrates an example extended field rendering using multiple media playback components in accordance with an embodiment of the present invention.

FIG. 5 illustrates an extended field of view composite rendering using MMPCs. The UE 110 associated with the MMPCs may receive one or more media, e.g. video data and/or audio data for composite rendering. The UE 110 may generate EFOV metadata based on the media data and/or any received sensor data as discussed in FIG. 1. Additionally or alternatively, the media data may be associated with EFOV metadata which may be received as a portion of or in association with the media data.

The UE 110 may utilize a single media player for rendering each portion of the EFOV composite, e.g. current frame and respective frame extensions. The number of MMPCs is utilized by the UE 110 for EFOV rendering is based on the number of frame extensions in the EFOV rendering. For example, in an instance in which the EFOV rendering has 2 frame extensions, e.g. left and right, the UE 110 may utilize three playback component players. In an instance in which there was only a single frame extension, the UE 110 may only utilize two playback component players.

MMPCs V1-3 may each render a portion of the EVOF composite. V2 renders the center portion, e.g. the current frame, and the audio, since the center portion is the render time base line. V1 renders the first frame extension, e.g. right frame extension; therefore V1 lags V2 by a time offset of $N_1$ frames. V3 renders the second frame extension, e.g. left frame extension; therefore V3 leads V2 by $N_2$ frames. The MMPCs V1 and V3 render the respective portion of the EFOV composite with muted audio. The MMPCs V1-V3 may visually align the renderings based on the frame extension angle offsets. The MMPCs V1-V3 may render the EFOV composite in a specific resolution based on the extension ratio as discussed in FIG. 1.

The UI 110 may render a composite of the MMPCs renderings in to a single EFOV composite and display the EFOV composite on a display or user interface.

Example Composite Extended Field of View Playback Operations

Figure 6:
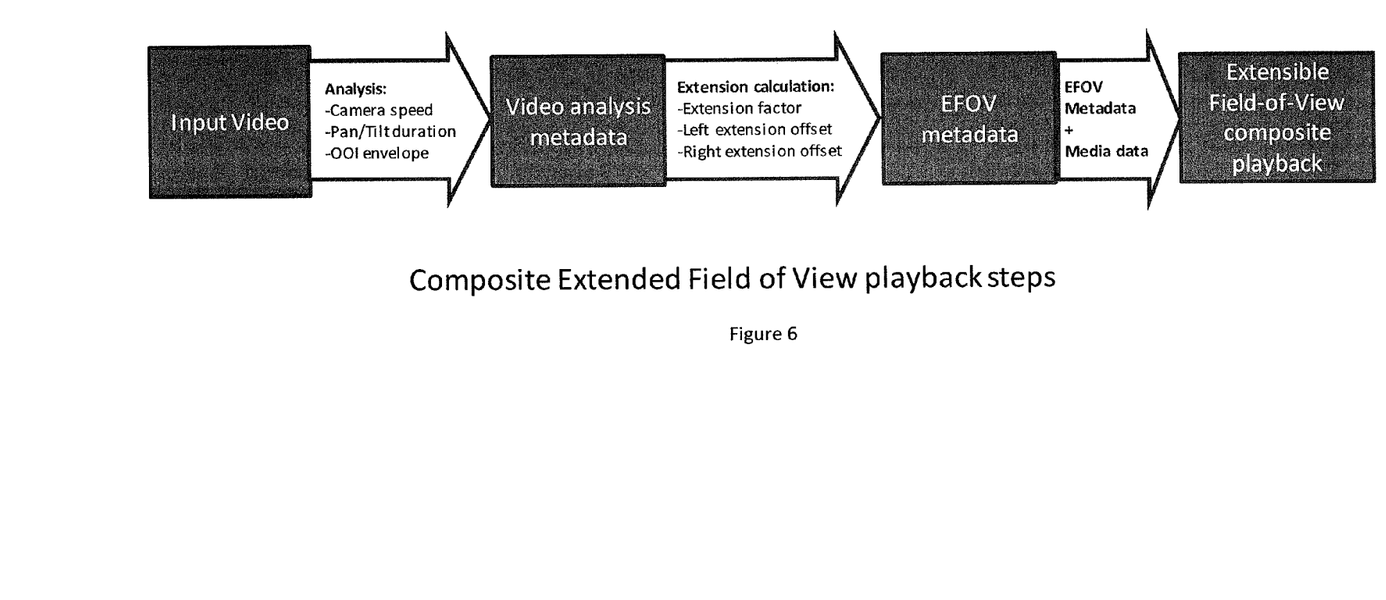
FIGS. 6 and 7A-C illustrate example composite extended field of view playback operations with various combinations of devices in accordance with an embodiment of the present invention.

FIG. 6 illustrates example composite extended field of view playback operations. In the example of FIG. 6 the UE 110 generates or has stored the media data. The UE 110 may receive the input video, e.g. media data. The UE may perform the camera motion analysis described in FIG. 1, including determining camera speed, camera motion duration, (e.g. pan tilt duration), and OOI boundary, (e.g. OOI envelope).

After the UE 110 performs the camera motion analysis, the UE may perform the frame extension calculations as described in FIG. 1, including extension factor, and respective frame extension offsets, e.g. frame extensions time and angle offsets. Next, the UE 110 may generate EVOF metadata based on the frame extension calculations. After the UE 110 has generated the EFOV metadata, the UE may render an EFOV composite on a display or other user interface.

Figure 7A:
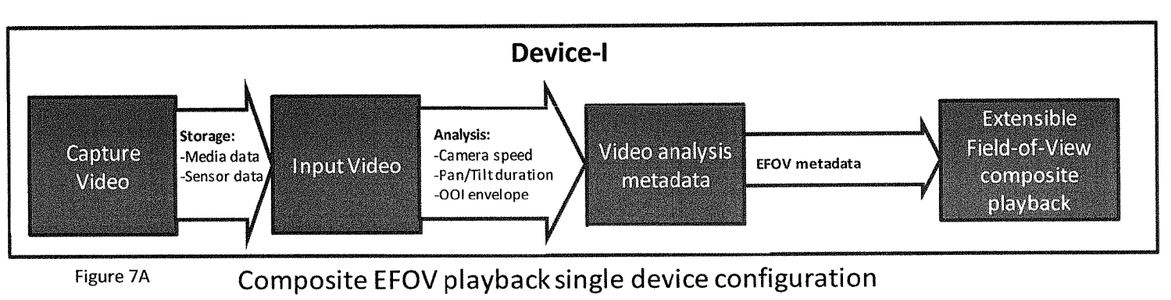

FIGS. 7A-7C illustrate example composite EFOV playbacks with various device configurations. In FIG. 7A the UE 110, e.g. device 1 performs all operations of the process to render a composite EFOV rendering. The UE 110 captures the media, e.g. video data, and stores the data in a memory with the associated sensor data. The UE 110 retrieves, e.g. receives, the media data and associated sensor data from the media storage memory and performs the analysis and calculations discussed in FIG. 6 to generate the EFOV metadata. The UE 110 may then render the EFOV rendering based on the media data and the EFOV metadata.

Figure 7B:
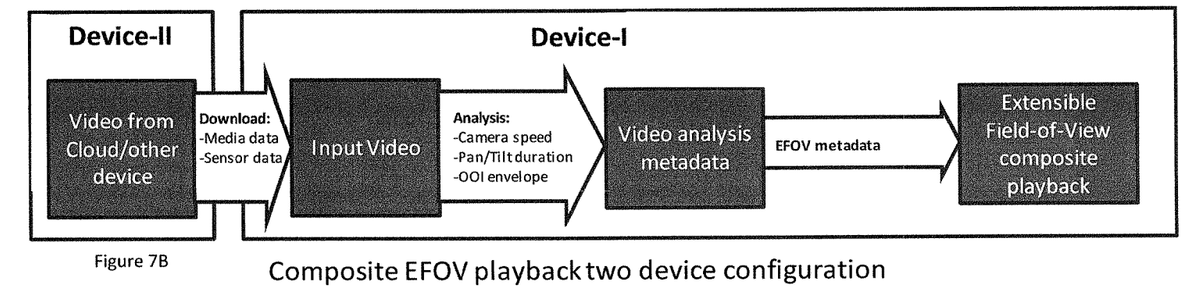

In FIG. 7B device 2 is a media database 120, such as a network, cloud server, or other device capable of storing media data. The UE 110, e.g. device 1, receives the media data and associated sensor data from the media database 120 through wired or wireless data communication. The UE 110 performs the camera motion analysis and frame extension calculations as discussed in FIG. 6 to generate EFOV metadata. The UE 110 may then render the EFOV composite rendering on a display or other user interface. In an example embodiment, device 2 may be another UE 110 capable of storing media data and/or sensor data.

Figure 7C:
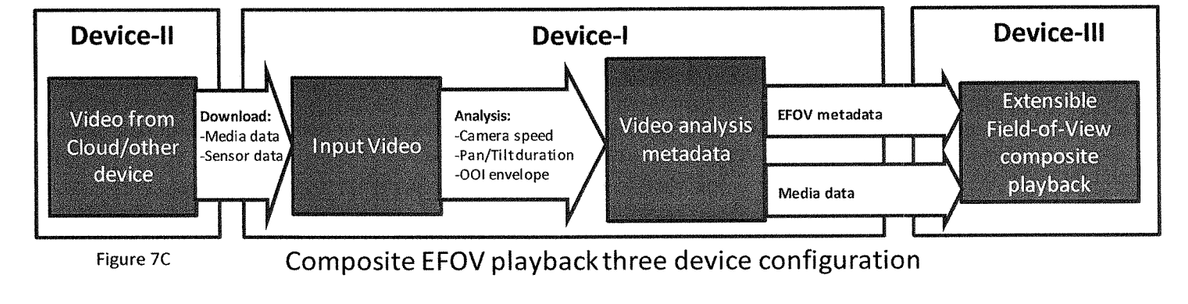

In FIG. 7C device 2 may be a media database 120 or a UE 110 capable of storing media and or sensor data, as discussed in FIG. 7B. The UE 110, e.g. device 1 may receive the media data and or sensor data from device 2. Device 1 may perform the camera motion analysis and frame extension analysis as discussed in FIG. 6 to generate EFOV metadata. Device 1 may transmit the EFOV metadata and/or the media data to a second UE 110, e.g. device 3. Device 3 may render the EFOV composite on a display or other user interface based on the EFOV metadata and media data.

Example Process for Rendering an Extended Field of View Composite

Figure 8:
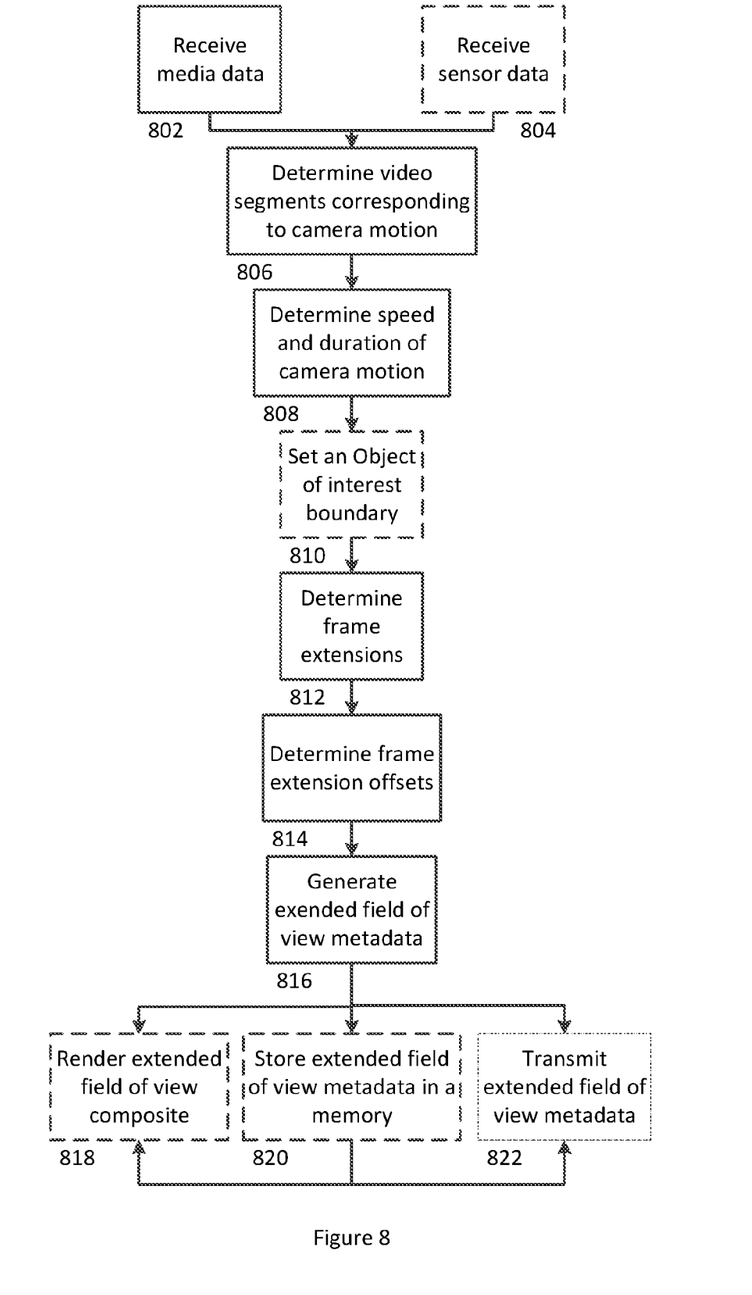
FIG. 8 is a flow chart illustrating the operations performed, such as by the apparatus of FIG. 2, in accordance with an example embodiment of the present invention.

Referring now to FIG. 8, the operations performed, such as by the apparatus 20 of FIG. 2, for rendering an extended field of view composite. As shown in block 802 of FIG. 8, the apparatus 20 may include means, such as a processor 22, a memory 24, a communications interface 26, or the like, configured to receive media data. The media data may be one or more video data files, which may also include audio data. The processor 22 may receive the media data from the memory 24 or the communications interface 26. The media data may be received, by the processor 22, from a single or multiple sources, such as a UE 110 or a media data base 120, through wired or wireless communication using the communications interface 26. Additionally or alternatively, the media data may be received from a camera associated with the apparatus 20 using the communications interface. The processor 22 may store the media data in the memory 24 for processing at a later time or process the media data without storage. In an instance in which the processor 22 is to process the media data, the processor may request and receive the media data from the memory 24.

As shown in block 804 of FIG. 8, the apparatus 20 may include a means, such as a processor 22, a memory 24, a communications module 26, or the like, configured to receive sensor data. The processor 22 may receive sensor data associated with the media data as a portion of or in association with the media data as described at 802. The sensor data may indicate camera orientation or angles, and/or camera motion during the capture of the media data. Sensor data may be collected by sensors, such as magnetic compasses, accelerometers, gyroscopes, or the like, associated with a camera capturing the media data.

As shown at block 806, of FIG. 8, the apparatus 20 may include means, such as a processor 22, or the like, configured to determine video frames corresponding to camera motion. The processor 22 may determine the frames of video which are associated with camera motion when the video was recorded based on the sensor data. For example, pan of the camera may be determined by sensor data provided by a magnetic compass, accelerometer, gyroscope, or like, and tilting may be determined by sensor data provided by an accelerometer, gyroscope, or like. The sensor data associated with a magnetic compass, accelerometer or gyroscope provides computationally efficient data for determining the camera motion time and duration. The processor 22 may correlate time data associated with the media data and time data associated with the sensor data to determine the video frames associated with camera motion.

Additionally or alternatively, the processor 22 may determine video frames corresponding to camera motion based on calculating a global camera pose estimate (global CPE). The global CPE is calculated by matching the content of the video data with street level images from a global database of a location based service provider. The calculated global CPE trace may provide an accurate description of the camera motion. Further, since the global CPE is based on the video data, itself, there is a reduction of error due to association of multiple data sources, e.g. media time and sensor data time.

As shown at block 808 of FIG. 8, the apparatus 20 may include means, such as a processor 22, or the like, configured to determine speed and duration of the camera motion. The processor 22 may determine a start of motion time and an end motion time based on time data associated with the sensor data and/or the global CPE to determine the duration of the camera motion. The processor 22 may determine the change in camera angle or orientation based on the sensor data or global CPE. The processor 22 may then determine the speed of the camera motion based on the change of camera angle or orientation and the duration of the camera.

In instances in which the processor 22 does not receive sensor data, the camera motion, speed and duration, and the video frames associated with the camera motion may be determined based on the media data only.

As shown at block 810 of FIG. 8, the apparatus 20 may include means, such as a processor 22, or the like, configured to set an object of interest (OOI) boundary. An OOI may be determined at the time the media data is captured, for example the camera motion may be associated with tracking an OOI during the capture of the media data. The OOI may be determined automatically, without user interaction, or manually by selecting an object as the object of interest. The processor 22 may set a boundary identifying the area in which the OOI is located in a frame to be extended based on the OOI determination, for example the rider and horse are within the boundary box depicted in FIG. 3.

As shown at block 812 of FIG. 8, the apparatus 20 may include means, such as a processor 22, or the like, configured to determine frame extensions. The processor 22 may determine the frame extensions, e.g. upper/lower, left/right, or the like, by determining the portion of the previous and subsequent frames which are not a portion of the current frame, as depicted in FIGS. 3 and 4A. In the example depicted in FIGS. 3 and 4A the left frame extension is derived from a frame subsequent to the current frame and the right frame extension is derived from a frame previous to the current frame, such as set forth below:

Frame extension width=width of (region covered at angular position $A1$–region covered at angular position $A2$).

The width of the frame extension may be the portion of the determined previous and subsequent frames which are not part of the current frame.

In example embodiments in which an OOI boundary has been set, the processor 22 may exclude the OOI boundary area from the frame extension determination. In some example embodiments, the OOI boundary area may be used as the center of the EFOV composite.

The processor 22 may determine the amount of frame extension to incorporate into a composite rendering based on the amount of field of view expansion required, e.g. extension ratio (ER). For example, the non-overlapping regions in the video frames during the camera motion may be used to generate a composite video rendering to fit the resolution of the display or user interface, as depicted in FIG. 4B, such as set forth below:

$ER$=(Frame extension width)/(Full frame resolution)

The extension ratio may be the frame extension width divided by the full frame resolution of the user interface 28.

As shown at block 814 of FIG. 8, the apparatus 20 may include means, such as a processor 22, or the like, configured to determine frame extension offsets. The processor 22 may determine frame extension offsets between the center region of the frame, which may contain the OOI, and the frame extensions including the angle offset and the time offset. Frame extension angle offsets may be the difference in camera capture angle at the time of capture of the media for the current frame and the frame extension frame which may be derived from sensor data from sensors such as gyroscopes, accelerometers, magnetic compasses, or the like. In an embodiment, the respective frame extension angle offsets may be determined by the angular difference of the global CPE of the current frame and the respective frame extension based on camera orientation. For example the angular difference may be determined by using the instantaneous orientation with respect to a point, such as north, using sensor data, such as gyroscope, a compass, or the like.

Additionally, the frame extension time offsets may be calculated based on the respective frame extensions and the speed of the camera motion. The processor 22 may determine the desired frame extension and use the speed, e.g. velocity of the camera motion (CMv) and duration of the camera motion (CMd) as derived from the sensor data or global CPE, to search for a frame which fulfills the following criteria; 1) left extension visually aligns with current frame, and 2) the width of the desired frame extension is satisfied. The frame extension time offset is determined in number of frames (N). The UE 110 may advance N frames and derive a frame extension time offset based on frame rate. N1 may be the time offset for the frame extension that is associated with a frame that is subsequent to the current frame and N2 may be the frame extension time offset that is associated with a frame that precedes the current frame, such as set forth below:

$N1, N2 = f1(ER, CMv, CMd), (N1/\text{frame rate}(FR)$ in frame per second(FPS), $N2/\text{frame rate in FPS}) < CMd$ The frame extension time offsets may be a function of the extension ratio, camera motion velocity, and/or camera motion duration.

The maximum duration of an EFOV rendering is approximately the camera motion duration, and the number of frames of EFOV rendering may be the duration of the camera motion multiplied by the frame rate, such as set forth below:

Number of frames for $EFOV = CMD*FR$

In some embodiments, frame extensions, such as left and right frame extensions, may have different angle offsets. For example, as depicted in FIG. 4A, the OOI, e.g. the horse and rider is moving with the camera motion. The center portion of the composite rendering is the current frame and timeline base, The time left frame extension is take at an instance T3 where T3>T2). The time right frame extension is taken at an instance T1 (where T1<T2). The angle offset of T1 to T2 smaller than the angle offset of T2 to T3 such that the frame extension associated with T3 is larger.

As shown at block 816 of FIG. 8, the apparatus 20 may include means, such as a processor 22, or the like, configured to generate EFOV metadata. The processor 22 may generate EFOV metadata based on the frame extensions and frame extension offsets. EFOV metadata may include time range, frame extension offsets, extension factors, or the like. A time range metadata may include or be associated with information determining the temporal period during which EFOV playback is to be performed. The respective frame offsets and extension factors may be determined for the given temporal period. Frame extension metadata may be the value of the time offset in terms of time or frame number with respect to the current temporal playback position and angle offsets of the center of the field of view (FOV) extension with respect to the center of the current playback, for appending to the respective portion of the current image, (e.g. left, right, top, bottom, or the like). The extension factor may indicate the amount of FOV extension that is desired. The extension factor may be a ratio of FOV extension section and current native playback resolution. The extension factor may be used to select the playback offsets required for a given extension factor requirement. The processor 22 may then render the EFOV composite at 818, store the EFOV metadata in a memory at 820, or transmit the EFOV metadata at 822.

As shown at block 818 of FIG. 8, the apparatus 20 may include means, such as a processor 22, a user interface 28, or the like, configured to render an EFOV composite. The processor 22 may use multiple media playback components (MMPC) to render the field of view composite. MMPCs may simultaneously perform rendering from a single or multiple media sources, such as the UE 110 itself, other UEs, or media databases 120, for example multiple media clips.

The processor 22 may utilize a single media player for rendering each portion of the EFOV composite, e.g. current frame and respective frame extensions. The number of MMCPs that is utilized by the processor for EFOV rendering is based on the number of frame extensions in the EFOV rendering, such as by utilizing one more playback component players than the number of frame extensions. For example, in an instance in which the EFOV rendering has 2 frame extensions, e.g. left and right, the processor 22 may utilize three playback component players. In an instance in which there was only a single frame extension, the processor 22 may only utilize two playback component players.

MMPCs V1-3, of FIG. 5, may each render a portion of the EVOF composite. V2 may render the center portion, e.g. the current frame, and the audio, since the center portion is the render time base line. V1 may render the first frame extension, e.g. right frame extension, therefore V1 lags V2 by a timing offset of $N_1$ frames. V3 may render the second frame extension, e.g. left frame extension; therefore V3 leads V2 by $N_2$ frames. The MMPCs V1 and V3 may render the respective portion of the EFOV composite with muted audio. The inter-player offset, e.g. camera angle offset, may be used to visually match the current frame edges with the edges of the frame extensions.

The processor 22 may render a composite of the MMPCs renderings in to a single EFOV composite and cause the display the EFOV composite on a user interface 28.

As shown at block 820 of FIG. 8, the apparatus 20 may include means, such as a processor 22, a memory 24, or the like, configured to store the EFOV metadata in a memory. The processor 22 may store the EFOV metadata in a memory, such as memory 24 for later rendering at 818, or transmission at 822.

As shown at block 822 of FIG. 8, the apparatus 20 may include means, such as a processor 22, communications interface 26, or the like, configured to transmit EFOV metadata. The processor 22 may cause the transmission of EFOV metadata and/or the associated media data. The EFOV metadata may be a transmitted as a portion of the media data, in association or conjunction with the media data, or be transmitted with a media data identifier. The media data identifier may be used by the apparatus or other devices to associate the EFOV metadata with the media data. The communications interface 26 may transmit the EFOV metadata to the media database 120 for storage or to one or more UEs 110 for storage or rendering.

The generation of EFOV metadata for the rendering of EFOV composites allows a video player to extend the displayed view utilizing multiple previous and subsequent video frames. This also allows for a higher resolution EFOV composite when the original video data is at a lower resolution.

As described above, FIG. 8 illustrates a flowchart of an apparatus 20, method, and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 24 of an apparatus employing an embodiment of the present invention and executed by a processor 22 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as illustrated by the dashed outline of blocks 804, 810, 818, 820, and 822 in FIG. 8. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
receiving media data comprising a plurality of video frames;
determining, with a processor, video frames recorded during camera motion;
determining speed and duration of the camera motion;
determining at least one frame extension field outside a current video frame based on previous and subsequent video frames recorded during the camera motion;
determining a frame extension offset for the at least one frame extension field based on the camera motion;
generating an extended field of view metadata based on the frame extension field and frame extension offsets; and
rendering an extended field of view composite based on the media data and the extended field of view metadata, wherein the rendering of the extended field of view composite is performed by multiple media playback components simultaneously rendering two or more media sources into the extended field of view composite, wherein a number of multiple media playback components utilized is based on the frame extension field, wherein each of the multiple media playback components renders a different visual portion of the extended field of view composite.

2. The method according to claim 1 further comprising:
setting an object of interest boundary; and wherein the at least one frame extension field is further based on the object of interest boundary.

3. The method according to claim 1 further comprising:
receiving sensor data associated with the media data;
wherein the determining video frames recorded during the camera motion is at least in part based on the sensor data; and
wherein the determining speed and duration of the camera motion is further based on the sensor data.

4. The method according to claim 1, where in the frame extension offset comprises a frame angle offset or a frame time offset.

5. The method according to claim 1, wherein the extended field of view metadata comprises a time range, a left extension offset, a right extension offset, a top extension offset, a bottom extension offset, or an extension factor.

6. An apparatus comprising at least one processor and at least one memory including computer program code, the at least one memory and computer program code configured to, with the processor, cause the apparatus to at least:
receive media data comprising a plurality of video frames;
determine video frames recorded during camera motion;
determine speed and duration of the camera motion;
determine at least one frame extension field outside a current video frame based on previous and subsequent video frames recorded during the camera motion;
determine a frame extension offset based on the camera motion;
generate an extended field of view metadata based on the frame extension field and frame extension offsets; and
render an extended field of view composite based on the media data and the extended field of view metadata, wherein the rendering of the extended field of view composite is performed by multiple media playback components simultaneously rendering two or more media sources into the extended field of view composite, wherein a number of multiple media playback components utilized is based on the frame extension field, wherein each of the multiple media playback components renders a different visual portion of the extended field of view composite.

7. The apparatus according to claim 6, wherein the at least one memory and the computer program code are further configured to:
set an object of interest boundary; and
wherein the at least one frame extension field is further based on the object of interest boundary.

8. The apparatus according to claim 6, wherein the at least one memory and the computer program code are further configured to:
receive sensor data associated with the media data;
wherein the determining video frames recorded during the camera motion is at least in part based on the sensor data; and
wherein the determining speed and duration of the camera motion is further based on the sensor data.

9. The apparatus according to claim 6, where in the frame extension offset comprises a frame angle offset or a frame time offset.

10. The apparatus according to claim 6, wherein the extended field of view metadata comprises a time range, a left extension offset, a right extension offset, a top extension offset, a bottom extension offset, or an extension factor.

11. A computer program product comprising at least one non-transitory computer-readable storage medium having computer-executable program portions stored therein, the computer-executable program code portions comprising program code instructions configured to:
receive media data comprising a plurality of video frames;
determine video frames recorded during camera motion;
determine speed and duration of the camera motion;
determine at least one frame extension field outside a current video frame based on previous and subsequent video frames recorded during the camera motion;
determine a frame extension offset for the at least one frame extension field based on the camera motion;
generate an extended field of view metadata based on the frame extension field and frame extension offsets; and
render an extended field of view composite based on the media data and the extended field of view metadata, wherein the rendering of the extended field of view composite is performed by multiple media playback components simultaneously rendering two or more media sources into the extended field of view composite, wherein a number of multiple media playback components utilized is based on the frame extension field, wherein each of the multiple media playback components renders a different visual portion of the extended field of view composite.

12. The computer program product according to claim 11, wherein the computer-executable program code portions further comprise program code instructions configured to:
set an object of interest boundary; and
wherein the at least one frame extension field is further based on the object of interest boundary.

13. The computer program product according to claim 11, wherein the computer-executable program code portions further comprise program code instructions configured to:
receive sensor data associated with the media data;
wherein the determining video frames recorded during the camera motion is at least in part based on the sensor data; and
wherein the determining speed and duration of the camera motion is further based on the sensor data.

14. The computer program product according to claim 11, where in the frame extension offset comprises a frame angle offset or a frame time offset.

15. The computer program product according to claim 11, wherein the extended field of view metadata comprises a time range, a left extension offset, a right extension offset, a top extension offset, a bottom extension offset, or an extension factor.

16. The method according to claim 1, wherein the number of multiple media playback components utilized is two utilized multiple media playback components for one frame extension and three multiple media playback components for two frame extensions.

* * * * *

UNITED STATES PATENT AND TRADEMARK OFFICE
CERTIFICATE OF CORRECTION

PATENT NO. : 9,930,253 B2
APPLICATION NO. : 14/264596
DATED : March 27, 2018
INVENTOR(S) : Mate et al.

Page 1 of 1

It is certified that error appears in the above-identified patent and that said Letters Patent is hereby corrected as shown below:

In the Claims

Claim 1, Column 16, Line 63, delete "field" and insert --fields--

Claim 6, Column 17, Line 39, delete "field" and insert --fields--

Claim 11, Column 18, Line 28, delete "field" and insert --fields--

Signed and Sealed this
Twenty-eighth Day of May, 2019

Andrei Iancu
*Director of the United States Patent and Trademark Office*